Patented Feb. 6, 1934

1,946,255

UNITED STATES PATENT OFFICE 1,946,255

PREPARATION OF CARBOXYLIC ACIDS

Gilbert B. Carpenter, Elizabeth, N. J., assignor to E. I. du Pont de Nemours & Company, Wilmington, Del., a corporation of Delaware No Drawing. Application June 28, 1932
Serial No. 619,738

16 Claims. (Cl. 260—116)

This invention relates to a process for the formation of organic compounds and particularly to the preparation of monocarboxylic acids by the interaction of aliphatic alcohols and carbon monoxide in the presence of a catalyst.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of an aliphatic alcohol with a carbon oxide in the presence of a catalyst. Another object of this invention is to provide a process for the preparation of acids having the structural formula: $C_nH_{2n+1}COOH$— from alcohols having the structural formula: $C_nH_{2n+1}OH$— by subjecting the alcohols to the action of the carbon monoxide in the presence of a hydrogen halide catalyst. Other objects will hereinafter appear.

I have found that organic acids can be prepared by the interaction of the aliphatic alcohols and carbon monoxide in the presence of a hydrogen halide or a compound which decomposes to form a hydrogen halide under the conditions existing during the reaction. In order to effect the reaction the reactants together with a compound or hydrogen halide, are passed into the reaction chamber under suitable pressure and temperature conditions. Generally, it is preferable to have in the reaction chamber a catalyst for the reaction such as, for example, an acid catalyst, phosphoric acid, boric acid, etc., or a metal halide such as manganese chloride, calcium chloride, etc. or any other suitable catalyst for the reaction.

These catalysts may be supported on various types of supports such, for example, as silica gel, alumina, pumice, etc., although a form of activated carbon, such as activated charcoal, is preferred.

The catalysts which may be used associated with the hydrogen halide include the acid catalysts such as phosphoric acid, arsenic acid, boric acid, silico tungstic acid, etc.; the metallic halides which include more particularly the alkali and alkaline earth metal halides, viz. the bromides, chlorides, and iodides of lithium, sodium, potassium, rubidium, calcium, caesium, strontium, magnesium, and barium, as well as the halides of the following metals: tin, iron, cobalt, nickel, bismuth, manganese, lead, tellurium, zinc, cadmium, and others; and the acid salts of arsenic, boron, chromium, vanadium, silicon, molybdenum, tungsten, e. g. phospho-tungstic acid, chromium vanadate, etc. These catalysts are all of an acidic nature. That is, either they are acids or under the conditions of the reaction hydrolyze or otherwise decompose to give an acidic constituent. Such catalysts will be designated in the claims as "solid acidic catalysts" in contra-distinction to the volatile halides which I will now more fully particularize.

The volatile halides which I prefer to employ include the hydrogen halides, e. g. hydrogen chloride, hydrogen iodide, and hydrogen bromide. It is not essential that the halides be added as a hydrogen halide to the reaction for compounds which decompose to give such halides or which form the halides under the conditions of the reaction, are likewise suitable. Examples of such compounds are the volatile organic halides, as methyl and ethyl chloride, iodide, bromide, etc., as well as the ammonium halides, e. g. ammonium chloride, ammonium iodide, chloramine, etc.

The halide is preferably added to the alcohol and carbon monoxide prior to the reaction, but it may be added in portions during the progress thereof or in any other suitable manner.

The alcohol-carbon monoxide reaction which can be accelerated by the above described catalysts may be expressed as follows:

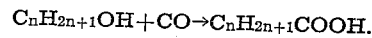
$$C_nH_{2n+1}OH + CO \rightarrow C_nH_{2n+1}COOH.$$

In accordance with the particular operating conditions, it will be found that, in some instances, the acid may not be formed directly in the free state, but may be produced as the ester of the alcohol. The alcohols used may be replaced, if desired, wholly or partly by the corresponding alkyl ethers of the alcohols or other compounds having one or more separate hydrolyzable alkoxy groups, such as dimethyl ether, diethyl ether, or the mixed alkyl ethers, the alkyl esters, and in addition compounds such as the alkyl amines,—methylamine, ethylamine, etc., or the alkyl halides,—methyl chloride, ethyl bromide, etc. When using the alkyl halides little or no additional volatile halide is usually required.

The synthesis can generally be efficiently carried out under the following operating conditions. The pressure may vary from approximately 25 atmospheres to 900 atmospheres or higher with the preferable operating range in the neighborhood of 350–700 atmospheres. These pressures do not differ materially from those used when other types of catalysts are employed for this synthesis nor do the temperatures vary appreciably from those already known for reactions of this type. For example, the process can be suitably carried out, with my catalyst, at temperatures of between 200–400° C., but still higher or lower temperatures may also be used in some cases, the speed of the reaction being increased, as would be expected, by the use of higher temperatures.

The carbon monoxide used may be obtained from various commercial sources, such, for example, as from water gas, producer gas, coke oven gas, etc., but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohols and carbon monoxide on one pass thru the conversion apparatus. Other strictly inert gases usually act similarly. It is, of course, understood that instead of introducing methanol itself into the reaction chamber substances or mixtures of substances which decompose by hydrolyzing, for example, to form alcohols or which decompose to form esters or ethers may be employed, but generally I prefer to introduce methanol directly into the gas stream. Experts in this art know that it is advantageous, altho not essential, to have water vapor present during the methanol-carbon monoxide to acetic acid reaction. This is true also when the reaction is conducted with compounds which decompose to give the alcohol and is especially advantageous when the compound is such that it forms the alcohol by hydrolysis.

The process can be conveniently carried out by passing purified carbon monoxide into aqueous methanol maintained at such a temperature that the issuing gases will have the requisite proportion of methanol, carbon monoxide, and a portion of the desired water vapor. The hydrogen halide or compound from which it is to be derived may be dissolved in water which may be injected into the system to give the desired amount of catalyst and total water vapor. Or, alternatively, the halide may be dissolved in aqueous methanol and the resulting solution injected into the carbon monoxide stream prior to the reaction. A gaseous composition, containing an excess of carbon monoxide over the methanol vapor, will give a good yield of acetic acid and its ester on one pass thru a converter, the temperature of the reaction chamber being maintained at approximately 350° C. and the pressure held in the neighborhood of 700 atmospheres.

Not only can methanol be catalyzed in the presence of carbon monoxide and my catalyst to acetic acid or methyl acetate, but the higher alcohols, such as ethyl alcohol, propyl alcohol, butyl alcohol, and even the higher molecular weight alcohols, such, for example, as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition under the conditions existing during the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohols the ethers, amines, halides, or esters thereof, the use of which will result in a good conversion with generally some slight modification in the ratio of acid to other products obtained.

I will now describe specific embodiments of my process but it will be understood that the details therein given and the compounds employed, either as reactants or catalysts, in no way restrict the scope of this invention but merely illustrate several methods of conducting the synthesis with my preferred catalysts.

Example 1.—A gaseous mixture, containing 80% carbon monoxide, and 5% each of methanol, water vapor, and hydrogen, is passed together with approximately 5% of hydrogen chloride over zinc chloride disposed in a conversion chamber suitable for the carrying out of gaseous exothermic reactions. The reaction is conducted at a temperature of approximately 350° C. and a pressure of approximately 700 atmospheres. Upon condensation of the products of the reaction a good yield of acetic acid is obtained together with a small amount of other aliphatic acids.

Example 2.—Into a gaseous mixture comprising 97.5% carbon monoxide, 0.1% carbon dioxide, and 2.4% undetermined is injected a liquid containing, in parts by weight, 69 parts of methanol, 23.5 parts of water, and 10 parts of hydrochloric acid (sp. gr. 1.19). This liquid is injected in an amount sufficient to give a methanol to carbon monoxide ratio, in the vapor phase, of 1:20. The resulting gaseous mixture, at a temperature of 350° C. and a pressure of 700 atmospheres is introduced into a reaction chamber containing pumice holding, supported thereon, 30% cupric chloride. The condensed products will contain acetic acid and methyl acetate.

Example 3.—Eighty-five parts of carbon monoxide are thoroughly diffused with 3 parts of hydrogen chloride, the resulting carbon monoxide, together with 5 parts of methanol, 2 parts of hydrogen, and 5 parts of water vapor, are passed into a conversion chamber, in which there is disposed a copper chloride catalyst supported on charcoal, at a temperature of 350° C. and a pressure of 700 atmospheres. An excellent yield of acetic acid and methyl acetate is obtained upon the condensation of the gases from the conversion.

The apparatus, which may be employed for conducting these reactions, may be of any conventional type and preferably one in which the temperature of the exothermic reaction can be readily controlled at the optimum value. Owing to the corrosive action of the acids present the interior of the converter and apparatus leading therefrom should preferably be protected. This may be accomplished by using glass or glass-lined apparatus or by plating the inner surfaces of the apparatus with silver, or using for the construction of this equipment acid-resisting alloy steels containing, for example, molybdenum, cobalt, tungsten, chromium, manganese, or nickel.

Various changes may be made in the method hereinbefore described without departing from the invention or sacrificing the advantages thereof.

I claim:

1. In a vapor phase process for the preparation of aliphatic organic acids the step which comprises contacting a compound selected from the group consisting of a compound containing at least one separate hydrolyzable alkoxy group and an aliphatic alcohol with carbon monoxide in the presence of a hydrogen halide catalyst.

2. In a vapor phase process for the preparation of aliphatic organic acids the step which comprises contacting a compound selected from the group consisting of a compound containing at least one separate hydrolyzable alkoxy group and an aliphatic alcohol with carbon monoxide in the presence of a hydrogen halide catalyst associated with a "solid acidic catalyst."

3. In a process of reacting an aliphatic alcohol and carbon monoxide, and thereby producing an aliphatic carboxylic acid, the employment of a volatile halide as a catalyst for the reaction.

4. In a process of reacting an aliphatic alcohol and carbon monoxide, and thereby producing an aliphatic carboxylic acid, the employment of a hydrogen halide as a catalyst for the reaction.

5. In a vapor phase process for the preparation of acetic acid from methanol and carbon monoxide the step which comprises effecting the reaction in the presence of the following coacting catalysts,—a volatile halide and a "solid acidic catalyst."

6. In a vapor phase process for the preparation of acetic acid from methanol and carbon monoxide the step which comprises effecting the reaction in the presence of the following coacting catalysts,—a hydrogen halide and a "solid acidic catalyst."

7. In a vapor phase process for the preparation of acetic acid from methanol and carbon monoxide the step which comprises effecting the reaction in the presence of the following coacting catalysts,—a volatile halide and a metal halide.

8. In a vapor phase process for the preparation of acetic acid from methanol and carbon monoxide the step which comprises effecting the reaction in the presence of the following coacting catalysts,—a hydrogen chloride and a metal chloride.

9. In a vapor phase process for the preparation of acetic acid from methanol and carbon monoxide the step which comprises effecting the reaction in the presence of the following coacting catalysts,—a hydrogen chloride, manganese chloride.

10. In a vapor phase process for the preparation of acetic acid from methanol and carbon monoxide the step which comprises effecting the reaction by passing methanol, carbon monoxide, and hydrogen chloride over manganese chloride.

11. In a process of reacting an aliphatic alcohol and carbon monoxide, and thereby producing an aliphatic carboxylic acid, the step which comprises effecting the reaction in the presence of the following co-acting catalysts,—a hydrogen halide associated with a "solid acidic catalyst."

12. In a process of reacting an aliphatic alcohol and carbon monoxide, and thereby producing an aliphatic carboxylic acid, the step which comprises effecting the reaction in the presence of the following co-acting catalysts,—a hydrogen halide associated with a metal halide.

13. In a process of reacting an aliphatic alcohol and carbon monoxide, and thereby producing an aliphatic carboxylic acid, the step which comprises effecting the reaction in the presence of the following co-acting catalysts,—a hydrogen halide associated with a supported acidic catalyst.

14. In a process of reacting an aliphatic alcohol and carbon monoxide, and thereby producing an aliphatic carboxylic acid, the step which comprises effecting the reaction in the presence of the following co-acting catalysts,—a hydrogen halide associated with an acid catalyst.

15. In a process of reacting methanol and carbon monoxide, and thereby producing acetic acid, the employment of a volatile halide as a catalyst for the reaction.

16. In a process of reacting ethanol and carbon monoxide, and thereby producing propionic acid, the employment of a volatile halide as a catalyst for the reaction.

GILBERT B. CARPENTER.